INVENTOR
Wilhelm Hocke

INVENTOR
Wilhelm Hocke

1

3,391,613
LIGHT METAL PISTON
Wilhelm Hocke, Stuttgart-Mohringen, Germany, assignor to Mahle Komm.-Ges., Stuttgart-Bad Cannstatt, Germany
Filed Feb. 27, 1967, Ser. No. 618,852
Claims priority, application Germany, Mar. 18, 1966, M 68,818
3 Claims. (Cl. 92—228)

ABSTRACT OF THE DISCLOSURE

A pair of annular segment inserts are embedded in a piston skirt adjacent the piston head of a light weight metal piston. Spaced cylindrical segment inserts line the inner wall of the skirt and are joined to cross-pieces lying against the annular segment inserts. The inserts and crosspieces have a lower coefficient of expansion than the piston for controlling the thermal expansion of the piston.

---

Light metal pistons are known which have a skirt which is connected throughout its entire circumference into the piston head adjacent the piston ring zone and at which point annular segment inserts are cast which are made of a material having a lower coefficient of expansion than the piston for the purpose of controlling thermal expansion of the piston. This expansion controlling effect is because the outer surface layer of light metal shrinks as it cools after having been cast to produce tension stresses which are later relieved when the piston is heated in an engine. At the same time, the insert is elastically compressed. Therefore, when the piston is heated in an engine, the stresses and elastic deformations are reduced and the pertinent portions of the skirt under thermal expansion react as though they were composed of a material having a coefficient of heat lying between that of the piston material and the insert material. The desired approximation of the amount of thermal expansion of the inserts is obtained by using inserts with thick walls whose outer circumferential portions lie very close to the surface of the skirt so that the light metal covering the inserts is very thin.

Light metal pistons have also been made having cylindrical segments made of a material with a lower coefficient of expansion than the piston and which are spaced in the middle portions of the skirt and are exposed to the hollow interior of the skirt. The expansion controlling effect of these inserts is that because the inserts with the layer of light metal skirt material connected to it form bimetallic bodies which, during heating or cooling, alter their curvature. In this case, the best results are obtained when the light metal skirt layer is two or three times thicker than the inserts.

It has been suggested to use both of the two mentioned types of inserts in such a way that the annular segment inserts adjacent the piston head controls by the shrinking effect, while the cylindrical segments exposed in the skirt from bimetallic bodies with the skirt material and are connected to the annular segment inserts by narrow webs.

The objects of this invention is to use a combination of both kinds of aforementioned inserts with better effect and by the use of a simpler means of construction.

In general, these objects are obtained by providing the cylindrical segment inserts with narrow struts which are joined to a cross-piece and which cross-piece lies against the annular segment inserts. This not only provides a reinforcement for the annular segment inserts, but increases the effective thickness of the annular segment insert for controlling the expansion stresses. Furthermore, this makes it possible to increase to a certain degree the thickness of the layer of light metal between the insert and the outer surface of the piston over that previously possible and facilitates the fabrication of the piston. The thickness of the annular segment inserts can be chosen independently of the thickness of the cylindrical segment inserts in such a way that their interior diameter has the same dimension of the interior diameter of the portions of the skirt which are in contact with the cylindrical segment inserts. Consequently, it is not necessary to offset the connecting struts which also facilitates fabrication. The inserts can be easily handled because the annular segment inserts can be joined to the cross-pieces of the cylindrical segment inserts by a simple means, as by spot welding, so that the combination forms a single unit. This unit can be as conveniently handled as the heretofore known inserts which are stamped from a metal blank and then bent.

The means by which the objects of the invention are obtained are described more fully with reference to the accompanying drawings in which.

The light weight metal piston composed of a metal such as aluminum has a piston head 10 in which there is a piston ring zone containing the piston ring grooves 21, 22 and 23 and a wrist pin boss 30. Piston skirt 40 is joined to the piston head 10 adjacent the ring zone.

Figures 2, 3:
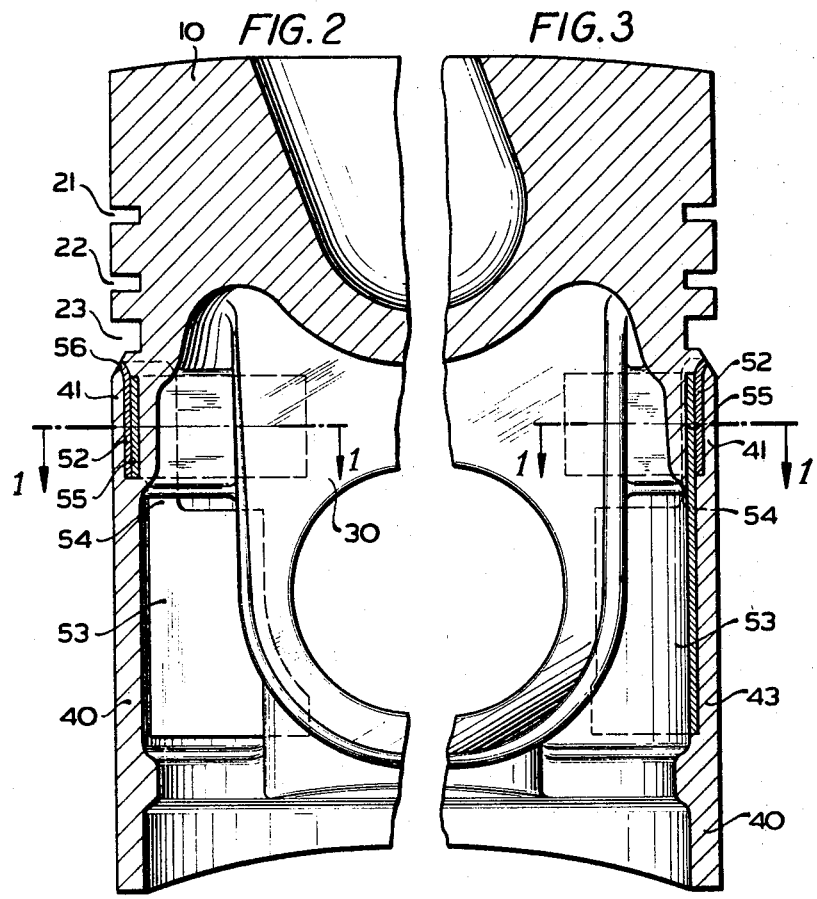
FIGURE 2 is a cross-sectional view taken on the line 1—1 in FIGURE 1.
FIGURE 3 is a cross-sectional view taken on the line 3—3 of FIGURE 1.
Figure 1:
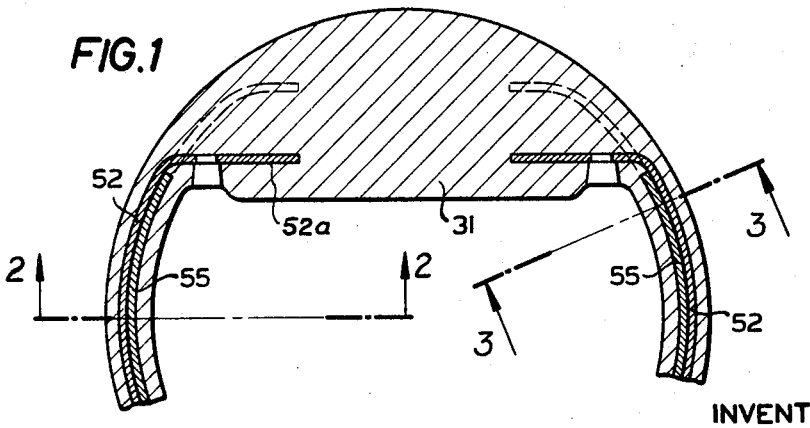
FIGURE 1 is a cross-sectional view through the piston of this invention as taken on the line 1—1 in FIGURES 2 and 3.
Figure 4:
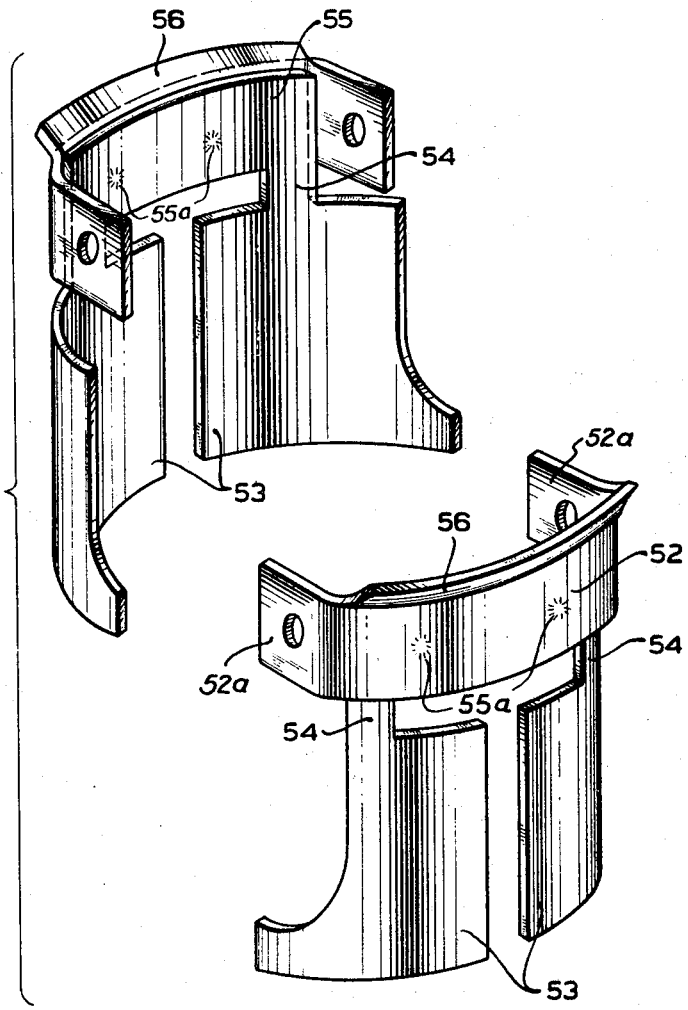
FIGURE 4 is an isomeric view of a pair of completed inserts.

The combined inserts which are to be cast in a piston are shown in FIGURE 4. The annular segment inserts 52 have ends 52a which are embedded in the piston ring boss 31 of the completed piston. The cylindrical segment inserts are formed of spaced parts 53 which are joined by narrow struts 54 to cross-pieces 55. The cross-pieces are connected to the annular segment inserts 52 by spot welds 55a. Thus, each pair of inserts 53 with their cross-pieces 55 together with the inserts 52 form a single unit. The top of this unit, including the cross-piece and the annular segment insert, are cast into the piston head adjacent the ring zone so that an outer layer 41 of light metal produces the tensile stress while the inserts 52 are exposed to the interior of the skirt and lie against the skirt material 53 to form a bimetallic body therewith. Annular segment inserts 52 have outwardly inclined upper edge portions 56 which extend through the piston so that their end edges are exposed through the outer surface of the skirt.

Having now described the means by which the objects of the invention are obtained, I claim:

1. A light weight metal piston such as for a diesel engine comprising a piston head having a piston ring zone, a hollow piston skirt joined to said head, annular segment inserts embedded in said skirt adjacent said ring zone, cylindrical segment inserts spaced from each other and attached to the inner wall surface of said skirt toward the open end of said skirt and being exposed to the interior of said skirt, curved cross-pieces lying against said annular segment inserts and reinforcing the same, struts joining said cylindrical segment inserts to said cross-pieces, and each of said inserts and cross-pieces having a lower coefficient of expansion than the light weight metal piston head and skirt.

2. A piston as in claim 1, further comprising spot welds connecting the cross-pieces to said annular segment inserts.

3. A piston as in claim 2, further comprising flanges outwardly inclined from the upper edge portions of said annular segment inserts and having their end edges exposed through the exterior surface of said skirt.

References Cited

UNITED STATES PATENTS

| 1,750,429 | 3/1930 | Pope | 92—229 |
| 2,715,052 | 8/1955 | Jardine | 92—229 |
| 3,369,466 | 2/1968 | Meier | 92—229 |

MARTIN P. SCHWADRON, *Primary Examiner.*

G. N. BAUM, *Assistant Examiner.*